(No Model.)

T. H. GRIGG.
WHEEL TIRE.

No. 597,164. Patented Jan. 11, 1898.

Witnesses.
A. V. Groupe
A. V. Blackwood.

Inventor.
Thomas H. Grigg,
per John B. Nolan
Attorney.

UNITED STATES PATENT OFFICE.

THOMAS H. GRIGG, OF PHILADELPHIA, PENNSYLVANIA.

WHEEL-TIRE.

SPECIFICATION forming part of Letters Patent No. 597,164, dated January 11, 1898.

Application filed July 28, 1896. Serial No. 600,751. (No model.)

*To all whom it may concern:*

Be it known that I, THOMAS H. GRIGG, a citizen of the United States, residing in the city and county of Philadelphia and State of Pennsylvania, have invented certain new and useful Improvements in Wheel-Tires, of which the following is a full, clear, and exact description, reference being had to the accompanying drawings, forming a part of this specification.

The object of this invention is to provide a wheel-tire possessing the essential advantages of a pneumatic tire, yet avoiding the objectionable features incident thereto; and to this end the invention, as generally stated, consists in the combination, with a wheel, of a rigid tire thereon and an interposed elastic connection which preferably, though not essentially, comprises a laterally-secured rubber ring or diaphragm encircling the felly of the wheel in such manner that the load upon the wheel is equally borne and distributed throughout the connection, so as to secure a uniform and effective cushioning action during the running of the wheel.

The invention also comprises various novel features of construction whereby advantages are gained, as will hereinafter appear.

Figure 1:
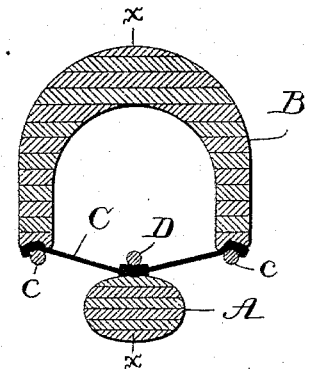
Figure 2:
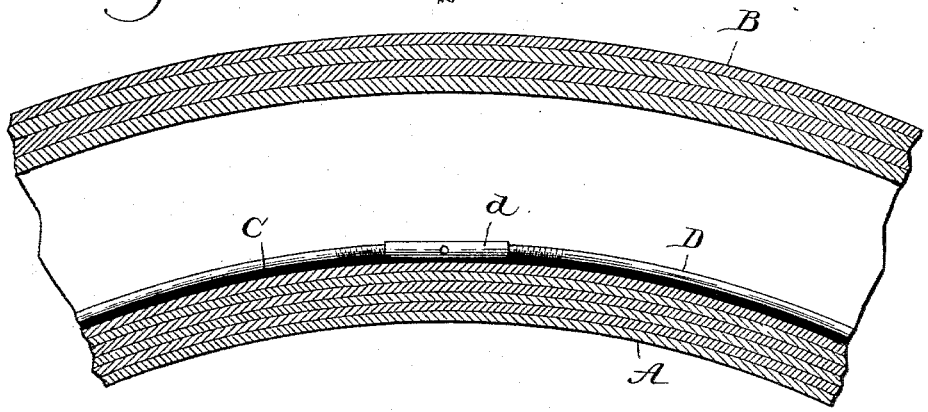
Figure 3:
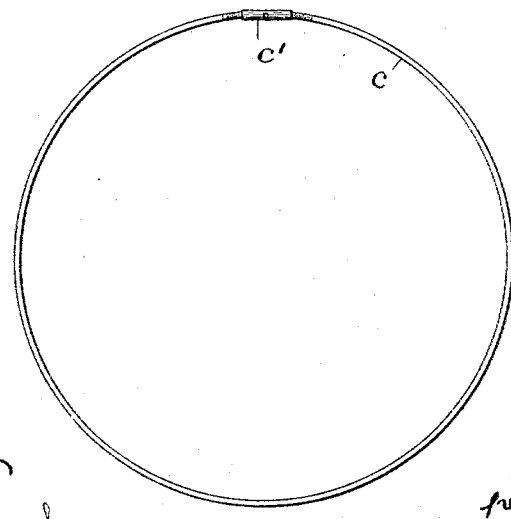

In the annexed drawings, Figure 1 is a transverse section through my improved tire as applied to the felly of a wheel. Fig. 2 is a vertical section, as on the line $x$ $x$ of Fig. 1. Fig. 3 is an elevation of one of the clamp-rings.

A represents a wheel-felly preferably elliptical or substantially so in cross-section. To this felly the tire B is applied, the same being indicated in this instance as constructed of superposed layers of wood or other suitable material, built or shaped, in contradistinction to bending into U form in cross-section, similarly to an arch, so as to possess the requisite strength and rigidity. The inner or open side of the tire is covered throughout by a ring or diaphragm C, of comparatively thin rubber or elastic fabric, whose lateral edges are clamped or otherwise firmly held against the opposing edges of the tire. In the present instance wire clamping-rings $c$ are employed for this purpose, the meeting ends of each ring being equipped with a turnbuckle $c'$, whereby the ring may be expanded to clamp or contracted to release the edge of the diaphragm, as desired. The felly A is peripherally secured to the face of the diaphragm, so as thereby to be yieldingly connected with the tire. By preference I secure the felly to the diaphragm by means of an expansible and contractible clamp-ring D, which encircles the latter, such ring being provided with a turnbuckle $d$, similarly to the ring $c$ above mentioned. The central and lateral bearing-surfaces of the diaphragm are reinforced, so as to strengthen them at these places.

From the above described construction it will be obvious that during the rotation of the wheel the load thereon is equally distributed throughout the diaphragm and that thereby a uniform cushioning effect is secured; that the wheel is capable of more or less lateral movement in respect to the tire, owing to the elasticity of the diaphragm, and that thereby is materially reduced the effect of shocks incident to riding upon rough roads, and, further, that by reason of the peculiar bodily-yielding action of the wheel in respect to its tire considerable initial force with comparatively little energy may be exerted upon the pedals by the rider.

It will be seen that my improved tire requires no inflation with air, thus obviating the otherwise liability of its being punctured, and also that there is no tendency of the tire to rebound upon its striking stones and similar obstructions in its path, but that it will, on the other hand, ride directly over the same, and this without shock to the rider.

I remark that although my described tire is designed more especially for use in connection with bicycles and analogous vehicles, yet obviously it may be applied to vehicle-wheels generally, and, further, that while I have herein shown and described the tire in its preferred form I do not confine myself to that particular construction, as obviously the invention may be considerably modified without departing from the fair spirit of my invention. Thus, for example, the construction of the felly and tire may be reversed—that is, the felly may be hollow, the tire solid, and the diaphragm laterally secured to the felly and centrally to the tire. In the light of my invention other modifications will suggest themselves to the mechanic.

I claim as my invention—

1. The combination of the felly, the rigid tire, and a transversely and longitudinally elastic web or band interposed between and secured to said felly and tire so as to provide a yielding connection throughout the periphery of the felly, the said web or band being secured along its lateral edges to one of said parts and, intermediate said edges, to the other part, substantially as described.

2. The combination of the felly, the rigid tire U-shaped in cross-section, and a transversely and longitudinally elastic connection between said felly and the sides of the tire, substantially as described.

3. The combination of the felly, the tire U-shaped in cross-section, the diaphragm covering the inner open side of said tire, the clamp-rings securing the lateral edges of said diaphragm to the opposing edges of the tire, and the central clamp-ring securing said diaphragm to the felly, substantially as described.

4. The described tire constructed of superposed layers of material built or shaped into U form in cross-section in contradistinction to bending, substantially as shown, and means for yieldingly securing said tire to the felly of a wheel.

5. The described tire constructed of superposed layers of material built or shaped into U form in cross-section, a diaphragm of rubber or elastic fabric on the inner open side of said tire, and means for securing said diaphragm to the felly of a wheel.

In testimony whereof I have hereunto affixed my signature in the presence of two subscribing witnesses.

THOMAS H. GRIGG.

Witnesses:
ANDREW V. GROUPE,
JOHN R. NOLAN.